No. 789,002. PATENTED MAY 2, 1905.
M. P. CARPENTER.
AUTOMATIC BRAKE FOR ELEVATORS.
APPLICATION FILED OCT. 20, 1904.
2 SHEETS—SHEET 1.
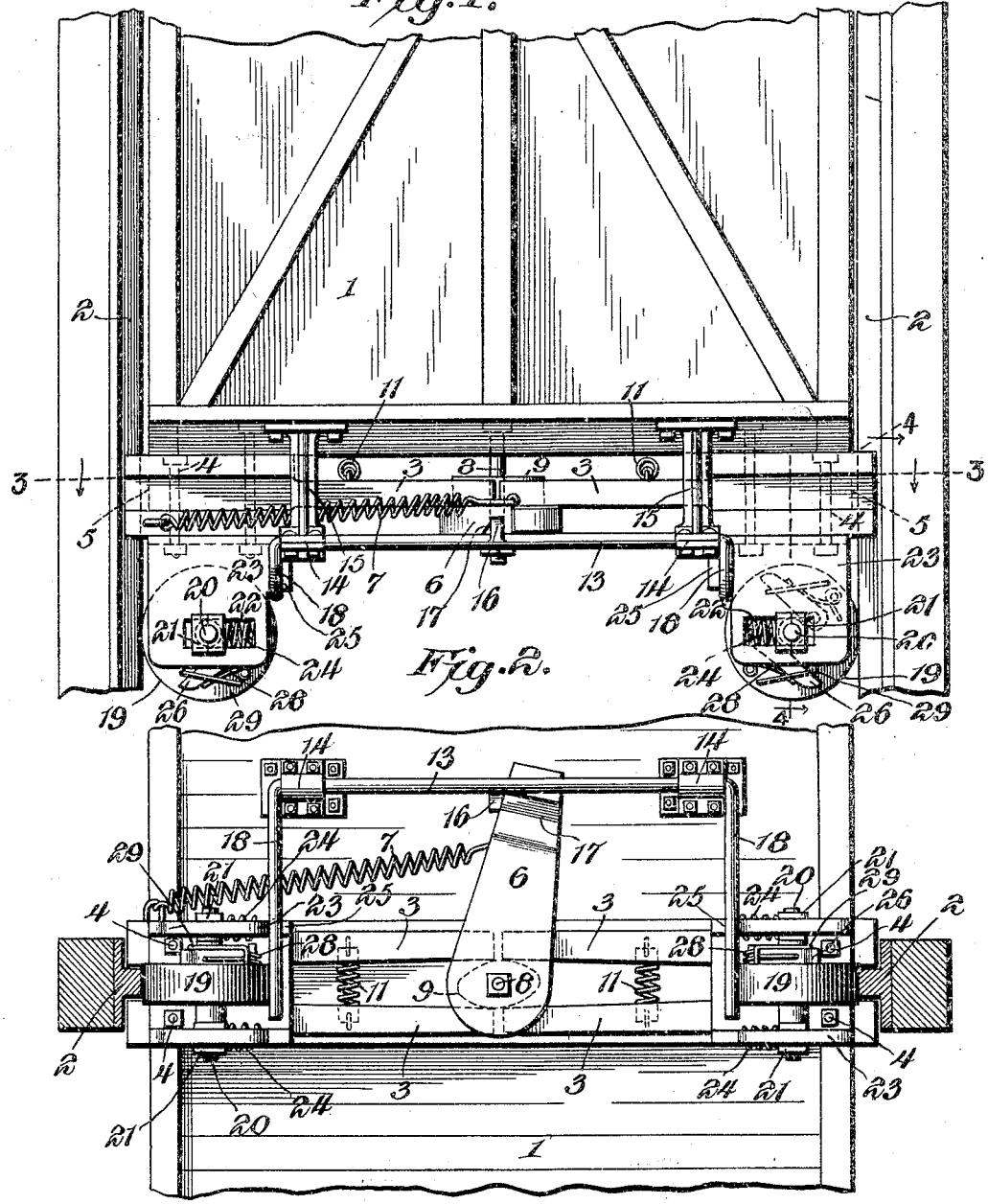
Mason P. Carpenter, Inventor,
Witnesses No. 789,002. PATENTED MAY 2, 1905.
M. P. CARPENTER.
AUTOMATIC BRAKE FOR ELEVATORS.
APPLICATION FILED OCT. 20, 1904.
2 SHEETS—SHEET 2.
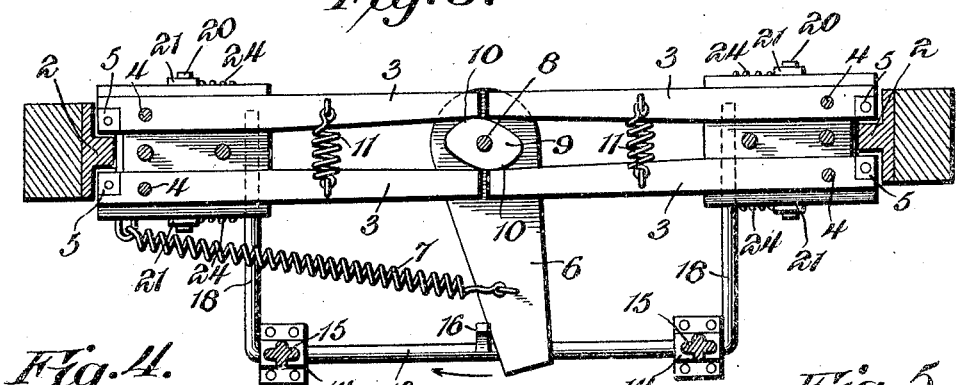
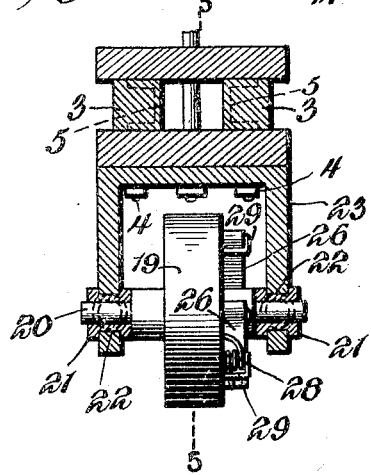
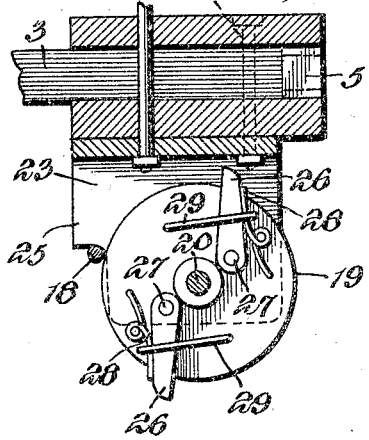
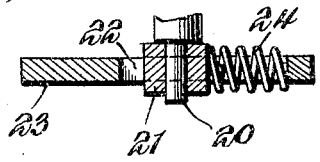
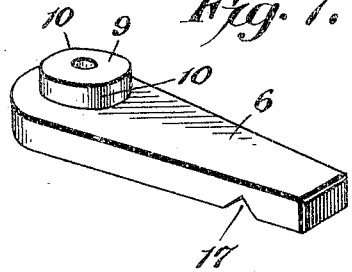
Witnesses
Howard D. Orr
N. F. Riley
Mason P. Carpenter, Inventor,
By E. G. Siggers
Attorney No. 789,002.                                    Patented May 2, 1905.

UNITED STATES PATENT OFFICE.

MASON PRICE CARPENTER, OF MEXICO, MISSOURI.

AUTOMATIC BRAKE FOR ELEVATORS.

SPECIFICATION forming part of Letters Patent No. 789,002, dated May 2, 1905.

Application filed October 20, 1904. Serial No. 229,287.

*To all whom it may concern:*

Be it known that I, MASON PRICE CARPENTER, a citizen of the United States, residing at Mexico, in the county of Audrain and State of Missouri, have invented a new and useful Automatic Brake for Elevators, of which the following is a specification.

The invention relates to improvements in automatic brakes for elevator-cars.

The object of the present invention is to improve the construction of automatic brakes for elevator-cars and to provide a simple, inexpensive, and efficient device capable of effectually preventing an elevator-car from dropping to the bottom of the shaft should the cable break or the car otherwise become disconnected from the controlling devices and adapted to stop an elevator-car gradually after the same has moved but a few inches, so as to produce the same effect on the occupants as an ordinary stop.

A further object of the invention is to provide simple and effective means for setting and tripping automatic brake mechanism, said setting and tripping mechanism having a rotary device arranged to travel at the same speed as the elevator and adapted to be operated through centrifugal force when the desired speed is attained.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is an elevation of a portion of an elevator-car provided with an automatic brake constructed in accordance with this invention. Fig. 2 is a reverse plan view, partly in section. Fig. 3 is a horizontal sectional view on the line 3 3 of Fig. 1. Fig. 4 is a vertical sectional view on the line 4 4 of Fig. 1. Fig. 5 is a sectional view on the line 5 5 of Fig. 4. Fig. 6 is a detail view illustrating the manner of mounting the slidable spring-actuated boxes of the rotary wheel or elements of the tripping devices. Fig. 7 is a detail view of the cam-lever.

Like numerals of reference designate corresponding parts in all the figures of the drawings.

1 designates an elevator-car, which may be of any desired construction and which is arranged between tracks 2, located at opposite sides of the elevator-shaft in the usual manner. The elevator-car is provided at opposite sides with brake-levers 3, arranged in pairs and fulcrumed near their outer ends on vertical pivots 4. The outer arms or engaging portions are located at opposite sides of the tracks 2 and are adapted to engage and clamp the same, suitable wear-plates 5 being preferably provided at the engaging portions of the levers. The wear-plates may be renewed when necessary, and yieldable means hereinafter described are employed for holding the brake-levers in engagement with the tracks, whereby the elevator-car is brought to a gradual stop after the same has moved but a few inches. By these means the car is brought to a stop without jolting its occupants and with only the same sensation as an ordinary stop. The inner or long arms of the brake-levers are of sufficient length to enable the requisite power to be obtained for positively checking the downward movement of the elevator-car, and the operation of the brake-levers is effected by means of a cam-lever 6 and a coiled spring 7. The cam-lever, which is fulcrumed on a pivot 8, is provided with a double cam 9, having opposite cam portions arranged to engage the inner arms of both pairs of brake-levers. The cam is of irregular elliptical form, and the opposite cam edges 10 gradually recede from the center or pivot 8, whereby when the cam-lever is moved in the direction of the arrow in Fig. 3 the inner arms of the brake-levers will be separated or spread to carry their outer arms into engagement with the track. The members of each pair of brake-levers are connected by a coiled spring 11, adapted to hold the inner arms of the levers in engagement with the cam 9 and at the same time maintain the outer arms of the levers normally out of engagement with the tracks, thereby preventing any unnecessary wear or friction. The coiled spring 7, which has one end attached to the cam-lever and its other end attached to a fixed portion of the elevator-car, is distended when the parts are arranged as shown in Fig. 3, and when the cam-lever is tripped it is adapted to swing the same and automatically apply the brake. Any other form of spring may be employed for actuating the cam-lever.

The cam-lever is set for automatic operation by means of a horizontal rock-shaft 13, journaled in suitable bearings 14 of hangers 15 and provided at an intermediate point with an arm 16, arranged to engage the cam-lever, and adapted to be swung out of such engagement by the means hereinafter described, whereby the cam-lever is tripped and released. The hangers 15 are suitably secured to the bottom of the elevator-car and depend therefrom, and the bearings 14 are sectional to enable the parts to be assembled and separated, especially when it is desired to remove the rock-shaft. The cam-lever is preferably provided at its lower face with a transverse groove 17, arranged to permit the said lever to be tripped by a slight movement of the rock-shaft. The mechanism may be made as sensitive as desired, as will be readily understood. The rock-shaft, which constitutes a setting device, is provided at its ends with approximately horizontal arms 18, which are adapted to be engaged by rotary tripping devices consisting of wheels 19, mounted on transverse shafts 20 and arranged to run on the tracks 2. The shaft 20 is journaled in suitable bearings of slidable boxes 21, mounted in horizontal slots 22 of brackets 23 and engaged by coiled springs 24, which yieldably hold the wheel in engagement with the track, whereby the tripping device will be positively operated. The journal-boxes 21, which are flanged, as clearly indicated in Fig. 4, are preferably composed of sections to enable the parts to be conveniently assembled. The brackets 23 are provided with inwardly-extending portions 25, forming shoulders and arranged to be engaged by the horizontal end arms of the rock-shaft to form stops for the same. The arms 18 of the rock-shaft when arranged as shown in Fig. 1 are located adjacent to the peripheries of the wheels of the tripping devices, and the said wheels are provided with a plurality of movable dogs 26, preferably mounted on pivots 27 and normally held within the area of the wheel by means of springs 28 and adapted to be thrown out by centrifugal force when the wheel reaches a predetermined speed. The movable dogs are arranged in keepers or guides 29, mounted on the wheel and adapted to guide the dogs and to limit their outward and inward movements. When the dogs are thrown outward by centrifugal force to the extended position illustrated in Fig. 5, the arm 18 of the rock-shaft is within their path and will be swung downward, whereby the rock-shaft 13 will be partially rotated. This movement will carry the upwardly-projecting setting-arm 16 downward sufficiently to release the cam-lever, and thereby permit an application of the brake. Any number of movable dogs may be provided so that the wheel will have to rotate only a short distance at the desired speed to trip the cam-lever. Should the elevator-car begin to fall through any cause, the brake will be automatically operated and will gradually bring the car to a stop after the same has moved only a few inches. Any suitable mechanism may be provided for resetting the brake and the rock-shaft or they may be reset by hand after the necessary repair has been completed.

Having thus fully described my invention, what I claim as new, and desire to secure by Letters Patent, is—

1. In a device of the class described, the combination of brake-levers arranged in pairs and designed to be mounted at opposite sides of an elevator-car, a horizontally-swinging lever provided with means for directly engaging each pair of levers, and means for setting and tripping the lever.

2. In a device of the class described, the combination of brake-levers arranged in pairs and extending from the center to opposite sides of an elevator-car, a lever provided with means carried by it for engaging each pair of levers, and a rotary device provided with means to be thrown out by centrifugal force for tripping said lever.

3. In a device of the class described, the combination of brake-levers arranged in pairs and designed to be mounted at opposite sides of an elevator-car, a double cam located between and arranged to directly engage the members of both pairs of levers, means for actuating the cam, and means for setting and tripping the same.

4. In a device of the class described, the combination of a pair of brake-levers designed to be mounted on an elevator-car, a lever provided with means for actuating the brake-levers, means for automatically swinging the lever, a rock-shaft provided with means for engaging the lever to hold the same against movement, and a rotary device provided with means adapted to be thrown outward by centrifugal force for disengaging the rock-shaft from the lever.

5. In a device of the class described, the combination of a pair of brake-levers designed to be mounted on an elevator-car, a horizontally-swinging lever having a cam arranged between and adapted to operate the levers, yieldable means for actuating the cam-lever, and means for setting and tripping the cam-lever.

6. In a device of the class described, the combination of a pair of brake-levers designed to be mounted on an elevator-car, a horizontally-swinging cam-lever arranged to directly engage and operate all of the brake-levers, a spring connecting the brake-levers for holding the same in engagement with the cam-lever, and means for operating the cam-lever.

7. In a device of the class described, the combination of a pair of brake-levers, a cam-lever arranged to operate the brake-levers, yieldable means for actuating the cam-lever, a rock-shaft having a setting-arm for holding the cam-lever, and a wheel arranged to run on a track and provided with tripping mechanism for rotating the rock-shaft.

8. In a device of the class described, the combination of brake-levers designed to be mounted at opposite sides of the elevator-car, a cam-lever arranged to operate the brake-levers, yieldable means for actuating the cam-lever, a rock-shaft having end arms and provided at an intermediate point with a setting-arm for holding the cam-lever, and wheels designed to be mounted on the elevator-car in position to run on the tracks of the same and provided with means arranged to be thrown outward for engaging the end arms of the rock-shaft.

9. In a device of the class described, the combination of brake-levers designed to be mounted at opposite sides of the elevator-car, a cam-lever arranged to operate the brake-levers, springs connecting the brake-levers for holding the same in engagement with the cam-lever, yieldable means for actuating the cam-lever, a rock-shaft having end arms and provided at an intermediate point with a setting-arm for holding the cam-lever, and wheels designed to be mounted on the elevator-car in position to run on the tracks of the same and provided with means arranged to be thrown outward for engaging the end arms of the rock-shaft.

10. In a device of the class described, the combination of brake-levers, a cam-lever for operating the brake-levers, yieldable means for actuating the cam-lever, a setting device for holding the cam-lever, a tripping device for releasing the cam-lever, said tripping device embodying a wheel having a combined guide and keeper, and a pivotally-actuated dog operating in the combined guide and keeper and arranged to be thrown outward beyond the wheel.

In testimony that I claim the foregoing as my own I have hereto affixed my signature in the presence of two witnesses.

MASON PRICE CARPENTER.

Witnesses:
W. Z. REED,
RALPH E. HEAD.